(12) United States Patent
Purkayastha et al.

(10) Patent No.: US 12,328,630 B2
(45) Date of Patent: Jun. 10, 2025

(54) CONFIGURATION MANAGEMENT FOR MULTIPLE CONFIGURATION COMMUNICATION SCENARIOS

(71) Applicant: QUALCOMM Incorporated, San Diego, CA (US)

(72) Inventors: Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/817,214

(22) Filed: Aug. 3, 2022

(65) Prior Publication Data
US 2024/0049077 A1    Feb. 8, 2024

(51) Int. Cl.
H04W 4/00       (2018.01)
H04W 36/00      (2009.01)
H04W 74/0833    (2024.01)
H04W 76/19      (2018.01)

(52) U.S. Cl.
CPC .  *H04W 36/00837* (2018.08); *H04W 36/0079* (2018.08); *H04W 74/0833* (2013.01); *H04W 76/19* (2018.02)

(58) Field of Classification Search
CPC ............. H04W 76/19; H04W 36/0079; H04W 74/0833; H04W 36/00837
See application file for complete search history.

(56) References Cited

U.S. PATENT DOCUMENTS

| 2021/0099926 A1* | 4/2021 | Chen ................... H04L 5/0098 |
| 2021/0105681 A1  | 4/2021 | Paladugu et al. |
| 2021/0168678 A1* | 6/2021 | Deenoo ................ H04W 76/19 |

(Continued)

FOREIGN PATENT DOCUMENTS

| WO | 2020117118 A1 | 6/2020 |
| WO | 2021046840 A1 | 3/2021 |

(Continued)

OTHER PUBLICATIONS

Apple Inc: "Consecutive Conditional Handover", 3GPP TSG-RAN WG2 Meeting #107bis, R2-1912464, 3rd Generation Partnership Project, Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019, XP051790509, 7 pages, the whole document.

(Continued)

*Primary Examiner* — Abdelnabi O Musa
(74) *Attorney, Agent, or Firm* — QUALCOMM Incorporated

(57) ABSTRACT

Various aspects of the present disclosure generally relate to wireless communication. In some aspects, a user equipment (UE) may receive, from a network node, information identifying a set of conditional configurations for a set of possible target cells associated with a first communication procedure, wherein the set of conditional configurations are associated with a master cell group or a secondary cell group. The UE may communicate with the network node or another network node in accordance with a conditional configuration, of the set of conditional configurations, associated with a second communication procedure. Numerous other aspects are described.

30 Claims, 7 Drawing Sheets

(56) References Cited

U.S. PATENT DOCUMENTS

| | | | |
|---|---|---|---|
| 2021/0211226 A1 | 7/2021 | Xu et al. | |
| 2022/0159530 A1* | 5/2022 | Kim | H04W 36/362 |
| 2022/0312282 A1* | 9/2022 | Chang | H04W 36/0079 |
| 2022/0386207 A1* | 12/2022 | Rugeland | H04W 76/15 |
| 2022/0394583 A1* | 12/2022 | Deenoo | H04W 74/0841 |
| 2023/0022967 A1* | 1/2023 | Chang | H04W 76/18 |
| 2023/0209425 A1* | 6/2023 | Da Silva | H04W 36/34 |
| | | | 370/331 |
| 2024/0073752 A1* | 2/2024 | Da Silva | H04W 36/0016 |
| 2024/0224150 A1* | 7/2024 | Chang | H04W 36/0079 |

FOREIGN PATENT DOCUMENTS

| | | |
|---|---|---|
| WO | WO-2021090626 A1 | 5/2021 |
| WO | WO-2021162870 A1 | 8/2021 |
| WO | 2022032205 A1 | 2/2022 |

OTHER PUBLICATIONS

International Search Report and Written Opinion—PCT/US2023/070953—ISA/EPO—Nov. 7, 2023.

Qualcomm Incorporated: "Introducing Suspension of SCG", R2-1908679, 3GPP TSG RAN WG2 Meeting #107, Prague, Czech, Aug. 26-30, 2019, pp. 1-4.

* cited by examiner

CONFIGURATION MANAGEMENT FOR MULTIPLE CONFIGURATION COMMUNICATION SCENARIOS

FIELD OF THE DISCLOSURE

Aspects of the present disclosure generally relate to wireless communication and to techniques and apparatuses for configuration management for multiple configuration communication scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Some communications systems may incorporate a plurality of generations of wireless access technologies to provide network services to UEs operating therein. For example, a 5G network may include a 5G RAN and an LTE EPC, with the LTE EPC providing control and signaling information. Some UEs may be dual-mode UEs that are compatible with both a non-standalone network deployment and a standalone network deployment. When a UE is operating in a standalone mode and a failure occurs during a random access channel (RACH) procedure on a target cell for which a conditional handover (CHO) is triggered, the UE may perform a cell selection procedure. If a selected cell is included in a set of CHO target cells, the UE may perform a RACH procedure on the selected cell and apply a dedicated configuration of the selected cell. In this case, the UE may transmit a reconfiguration complete message and may discard a source cell configuration.

Because a set of conditional configurations, provided to the UE, are based at least in part on the source cell configuration (e.g., the conditional configurations may be a delta relative to the source cell configuration), the UE may also discard the set of conditional configurations of other possible target cells. After discarding the set of conditional configurations that were related to a previous source cell, the UE may be configured with a new set of conditional configurations associated with a new source cell. However, obtaining a new set of conditional configurations may result in a latency associated with completing a communication procedure and/or an excess use of network resources.

SUMMARY

Some aspects described herein enable a UE to maintain a set of conditional configurations. For example, the UE may perform a first communication procedure (e.g., a CHO procedure), and may maintain the set of conditional configurations associated with the set of possible source cells. In this case, the UE may use the set of conditional configurations for a second communication procedure (e.g., a recovery procedure) at a subsequent time, thereby obviating a need to re-acquire conditional configurations for the second communication procedure.

Some aspects described herein relate to a method of wireless communication performed by a user equipment (UE). The method may include receiving, from a network node, information identifying a set of conditional configurations for a set of possible target cells associated with a first communication procedure, wherein the set of conditional configurations are associated with a master cell group or a secondary cell group. The method may include communicating with the network node or another network node in accordance with a conditional configuration, of the set of conditional configurations, associated with a second communication procedure.

Some aspects described herein relate to a UE for wireless communication. The UE may include a memory and one or more processors coupled to the memory. The one or more processors may be configured to receive, from a network node, information identifying a set of conditional configurations for a set of possible target cells associated with a first communication procedure, wherein the set of conditional configurations are associated with a master cell group or a secondary cell group. The one or more processors may be configured to communicate with the network node or another network node in accordance with a conditional configuration, of the set of conditional configurations, associated with a second communication procedure.

Some aspects described herein relate to a non-transitory computer-readable medium that stores a set of instructions for wireless communication by a UE. The set of instructions, when executed by one or more processors of the UE, may cause the UE to receive, from a network node, information identifying a set of conditional configurations for a set of possible target cells associated with a first communication procedure, wherein the set of conditional configurations are associated with a master cell group or a secondary cell group. The set of instructions, when executed by one or more processors of the UE, may cause the UE to communicate with the network node or another network node in accordance with a conditional configuration, of the set of conditional configurations, associated with a second communication procedure.

Some aspects described herein relate to an apparatus for wireless communication. The apparatus may include means for receiving, from a network node, information identifying a set of conditional configurations for a set of possible target cells associated with a first communication procedure, wherein the set of conditional configurations are associated with a master cell group or a secondary cell group. The apparatus may include means for communicating with the network node or another network node in accordance with a conditional configuration, of the set of conditional configurations, associated with a second communication procedure.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
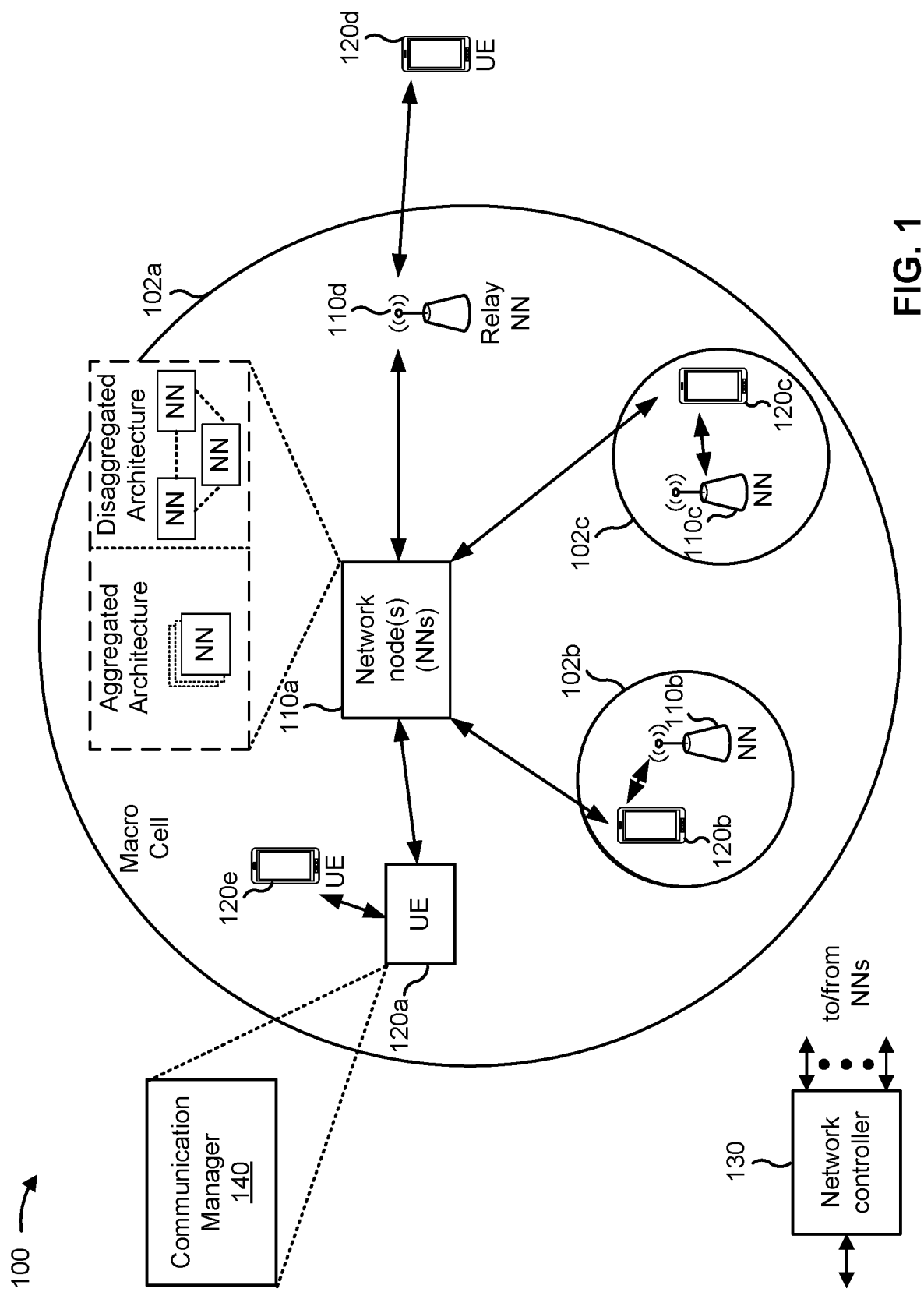
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, information identifying a set of conditional configurations for a set of possible target cells associated with a first communication procedure, wherein the set of conditional configurations are associated with a master cell group or a secondary cell group; and communicate with the network node or another network node in accordance with a conditional configuration, of the set of conditional configurations, associated with a second communication procedure. Additionally, or alternatively, the communication manager 140 may perform one or more other operations described herein.

As indicated above, FIG. 1 is provided as an example. Other examples may differ from what is described with regard to FIG. 1.

Figure 2:
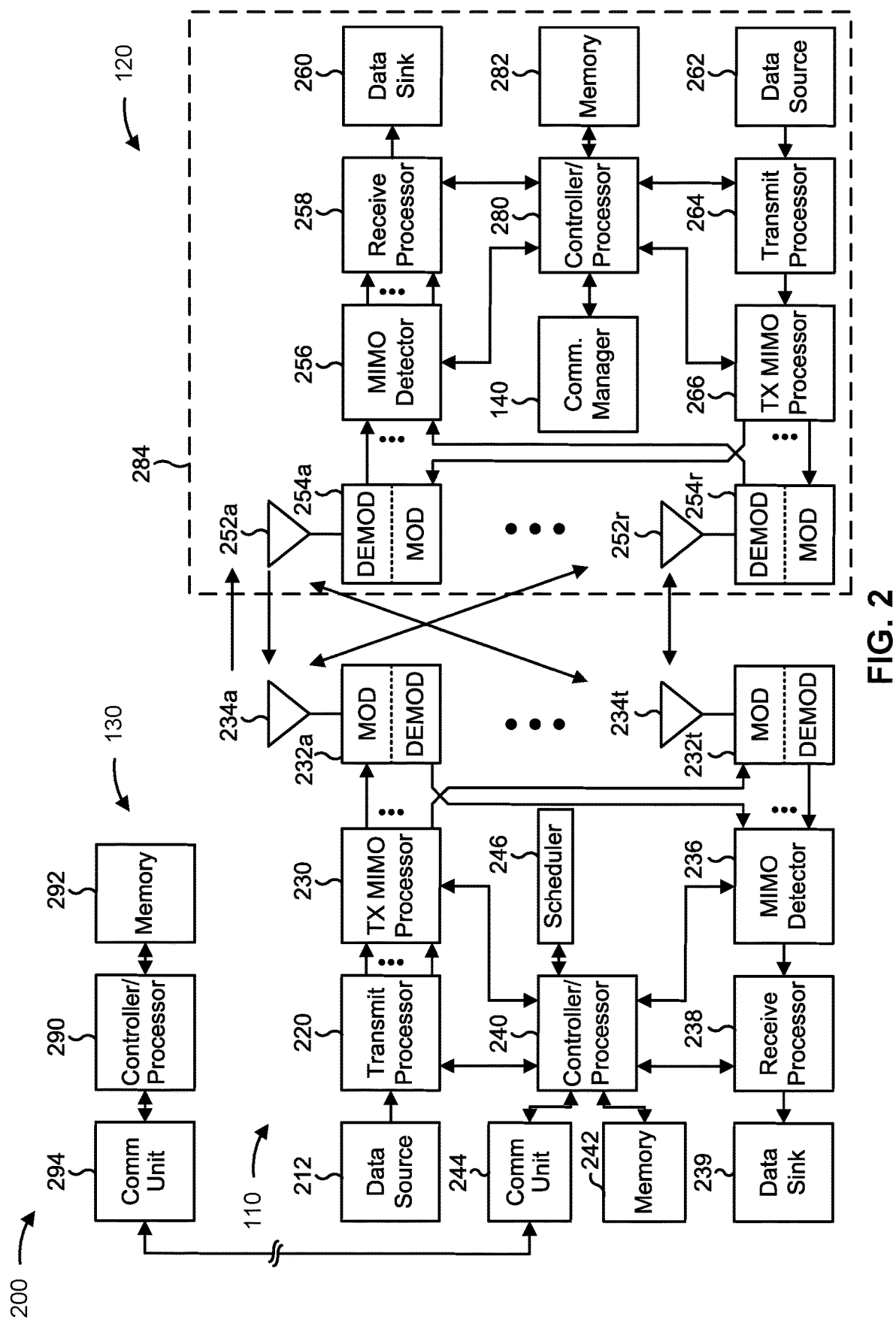
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 12 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the network node 110, the controller/processor 280 of the UE 120, and/or any other component(s) of FIG. 2 may perform one or more techniques associated with failure handling for multiple configuration communication scenarios, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving, from a network node, information identifying a set of conditional configurations for a set of possible target cells associated with a first communication procedure, wherein the set of conditional configurations are associated with a master cell group or a secondary cell group; and/or means for communicating with the network node or another network node in accordance with a conditional configuration, of the set of conditional configurations, associated with a second communication procedure. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
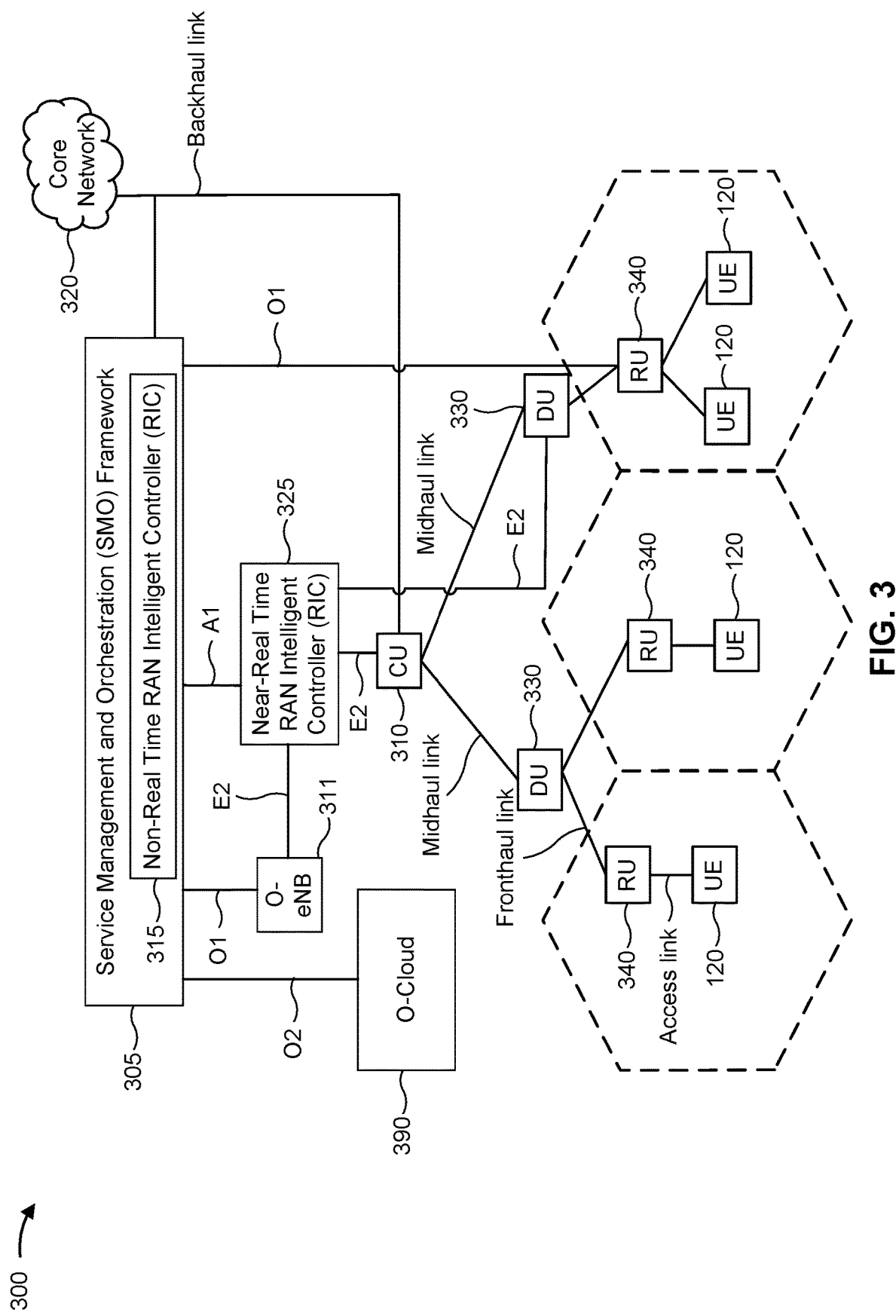
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
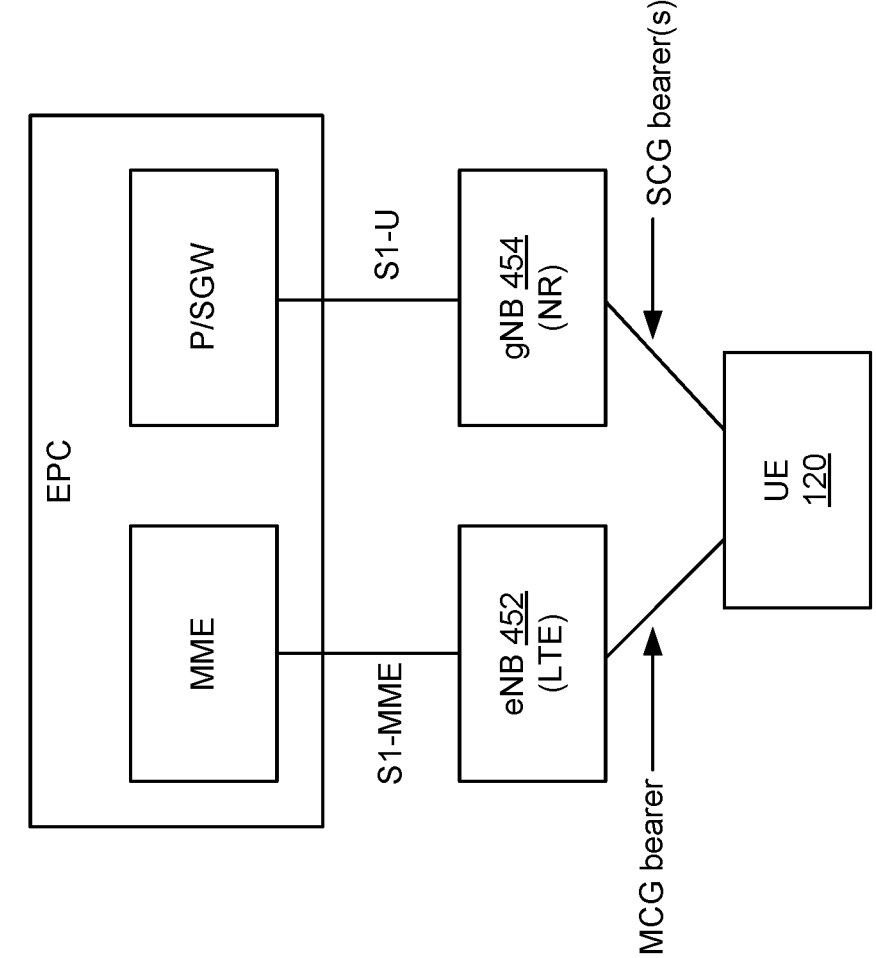
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). Some other modes include an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 4, a UE 120 may communicate with both an eNB 452 (e.g., a 4G network node 110) and a gNB 454 (e.g., a 5G network node 110), and the eNB 452 and the gNB 454 may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB 452 and the gNB 454 may be co-located at the same network node 110. In some aspects, the eNB 452 and the gNB 454 may be included in different base stations 110 (e.g., may not be co-located).

As further shown in FIG. 4, in some aspects, a wireless network that permits operation in a 5G NSA mode may permit such operations using a master cell group (MCG) for a first RAT (e.g., an LTE RAT or a 4G RAT) and a secondary cell group (SCG) for a second RAT (e.g., an NR RAT or a 5G RAT). In this case, the UE 120 may communicate with the eNB 452 via the MCG, and may communicate with the gNB 454 via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB 454 and the eNB 452 may not transfer user plane information between one another. In some aspects, a UE 120 operating in a dual connectivity mode may be concurrently connected with an LTE network node 110 (e.g., an eNB 452) and an NR network node 110 (e.g., a gNB 454) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 4 is provided as an example. Other examples may differ from what is described with respect to FIG. 4.

As described above, some communications systems may incorporate a plurality of generations of wireless access technologies to provide network services to UEs operating therein. For example, a 5G network may include a 5G RAN and an LTE EPC, with the LTE EPC providing control and signaling information. A communications system may leverage a 4G network associated with the LTE EPC to provide faster and more reliable enhanced mobile broadband (eMBB) without providing a completely new core network technology and requiring customers to switch to 5G UEs. Such a deployment may be termed a "non-standalone" 5G deployment. In contrast, a "standalone" 5G deployment may use a 5G core network associated with a service based architecture (SBA) to provide control and signaling information, rather than the LTE EPC. Some UEs may be dual-mode UEs that are compatible with both a non-standalone network deployment and a standalone network deployment. In such cases, a UE may switch between a standalone mode and a non-standalone mode based at least in part on which network deployment the UE is using for communication services.

When a failure occurs (e.g., when a UE is operating in a standalone mode) during a random access channel (RACH) procedure on a target cell for which a conditional handover (CHO) is triggered, the UE may perform a cell selection procedure. If a selected cell is included in a set of CHO target cells, the UE may perform a RACH procedure on the selected cell and apply a dedicated configuration of the selected cell. In this case, the UE may transmit a reconfiguration complete message and may discard a source cell configuration. Because a set of conditional configurations, provided to the UE, are based at least in part on the source cell configuration (e.g., the conditional configurations may be a delta relative to the source cell configuration), the UE may also discard the set of conditional configurations of other possible target cells. Similarly, if the selected cell is not included in the set of CHO target cells, the UE may discard the source cell configuration and the conditional configurations of the other possible target cells and perform an RRC re-establishment procedure on the selected cell using a default configuration (which may be defined in a specification). In this case, the UE is reconfigured via an RRC reconfiguration message that is transmitted after the RRC re-establishment procedure succeeds. Additional detail regarding conditional configurations, also referred to as MCG configurations and configured using a CondReconfig-ToAddModList-r16 message, may be found in 3GPP Technical Specification (TS) 38.331.

After discarding the set of conditional configurations that were related to a previous source cell, the UE may be configured with a new set of conditional configurations associated with a new source cell. However, obtaining a new set of conditional configurations may result in a latency associated with completing a communication procedure and/or an excess use of network resources. Accordingly, in some cases the UE may receive, from a network node, configuration information identifying a group of MCG configurations associated with a set of conditional configurations associated with a set of possible target cells. In this case, the conditional configurations configured for the UE are not only associated with a single source cell that the UE is using, but with a set of possible target cells that the UE may use. However, the UE may still discard the conditional configurations during a communication procedure.

Some aspects described herein enable a UE to maintain a set of conditional configurations. For example, the UE may perform a first communication procedure (e.g., a CHO procedure), and may maintain the set of conditional configurations (e.g., MCG configurations or SCG configurations) associated with the set of possible source cells and received in connection with a group of MCG configurations. In this case, the UE may use the set of conditional configurations for a second communication procedure (e.g., a recovery procedure) at a subsequent time, thereby obviating a need to re-acquire conditional configurations for the second communication procedure. Based at least in part on maintaining the set of conditional configurations, the UE reduces a latency associated with completing a communication procedure and/or a utilization of network resources associated with configuring the UE.

Figure 5:
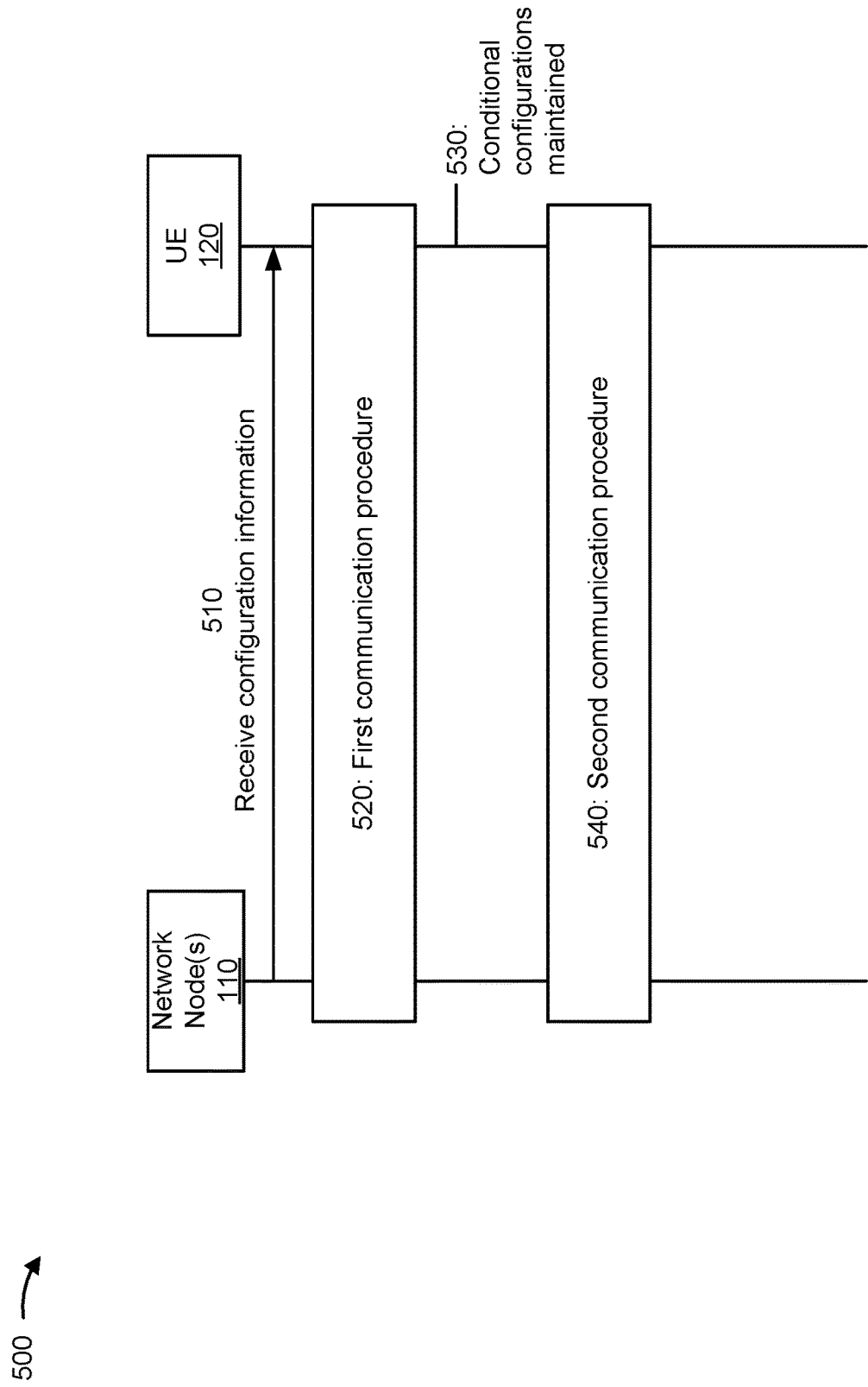
FIG. 5 is a diagram illustrating an example associated with failure handling for multiple configuration communication scenarios, in accordance with the present disclosure.

FIG. 5 is a diagram illustrating an example 500 associated with failure handling for multiple configuration communication scenarios, in accordance with the present disclosure. As shown in FIG. 5, example 500 includes communication between a network node 110 and a UE 120.

As further shown in FIG. 5, and by reference number 510, the UE 120 may receive information identifying a set of conditional configurations. For example, the UE 120 may receive a set of conditional configurations (e.g., MCG configurations or SCG configurations) associated with a CHO procedure. The UE 120 may receive the set of conditional configurations from the network node 110. In some aspects, the UE 120 may be operating in a standalone mode. In some aspects, the UE 120 may be triggered to perform a recovery procedure. For example, when a failure occurs during a RACH procedure on a target cell for which CHO is triggered, as described herein, the UE 120 may be triggered to perform a recovery procedure using the plurality of MCG configurations. In some aspects, the UE 120 may receive a plurality of SCG configurations. For example, in connection with a conditional primary secondary cell (PSCell) addition (CPA) procedure or a conditional PSCell change (CPC) procedure, the UE 120 may receive a set of SCG configurations.

In some aspects, the UE 120 may receive (e.g., from a network node 110) an indication of whether to maintain a set of conditional configurations (e.g., the set of MCG configurations or the set of SCG configurations) after completing the first communication procedure, as described herein. For example, the network node 110 may transmit a message including an indicator that the UE 120 is to maintain the set of conditional configurations after completing the first communication procedure. In this case, the UE 120 may maintain the set of conditional configurations and may use the set of conditional configurations for a subsequent second communication procedure, as described herein. In this way, the UE 120 and the network node 110 reduce a latency associated with obtaining the set of conditional configurations for the second communication procedure (e.g., by maintaining the set of conditional configurations rather than discarding the set of conditional configurations in connection with the first communication procedure). In contrast, when the UE 120 receives an indicator not to maintain the set of conditional configurations, the UE 120 may discard the set of conditional configurations during or after completion of the first communication procedure.

As further shown in FIG. 5, and by reference numbers 520, 530, and 540, the UE 120 may communicate with one or more network nodes 110 to complete a first communication procedure, maintain a set of conditional configurations, and use a conditional configuration of the set of conditional configurations for a second communication procedure. A communication procedure may include a plurality of messages or steps (e.g., an exchange of signals) or a single message or step (e.g., a single transmission or reception of a signal), which may or may not occur within a larger procedure. In other words, a first communication procedure, described herein, may be a first set of steps, and a second communication procedure, described herein, may be a second set of steps that is independent from the first set of steps. Alternatively, the first communication procedure may be a first step and the second communication procedure may be a second step, where the first step and the second step comprise all or part of some other communication procedure.

In some aspects, the UE 120 may detect a handover failure in a first communication procedure and perform a second communication procedure to recover from the handover failure of the first communication procedure. For example, the UE 120 may perform a recovery procedure on a selected target cell, and the recovery procedure may include a cell selection procedure, a RACH procedure, and/or a conditional handover. The UE 120 may detect a RACH failure associated with a RACH procedure and may perform a cell selection procedure as part of a recovery procedure. In this case, if the selected cell is included in a set of possible CHO target cells for which the set of conditional configurations are applicable, the UE 120 may maintain the set of conditional configurations after completion of the first communication procedure, as described herein. Alternatively, if the selected cell is not included in the set of possible CHO target cells for which the set of conditional configurations are applicable, the UE 120 may discard the set of conditional configurations (and a source cell configuration). During the recovery procedure, the UE 120 may apply a selected cell dedicated configuration to the selected cell. The selected cell dedicated configuration may be based at least in part on a source cell dedicated configuration of a source cell of the UE before a RACH procedure. For example, the UE 120 may apply an offset value or delta value to the source cell dedicated configuration.

In some aspects, the UE 120 may initiate an RRC re-establishment procedure not based at least in part on a handover failure. For example, the UE 120 may detect an MCG radio link failure (RLF) and may initiate an RRC re-establishment. In this case, the UE 120 may select a cell for the RRC re-establishment and may maintain the set of conditional configurations based at least in part on selecting the cell. For example, the UE 120 may transmit an RRC re-establishment request and may receive an RRC re-establishment message (e.g., a first communication procedure) with an indication to maintain a set of conditional configurations. In this case, the UE 120 may apply a conditional configuration, of the set of conditional configurations, to a selected cell and transmit an RRC re-establishment complete message (e.g., a second communication procedure). In other words, when the selected cell is associated with a conditional configuration provided with the set of MCG configurations, the UE 120 may apply the conditional configuration to the selected cell based at least in part on a successful re-establishment with the selected cell. In this case, a latency to complete re-establishment is reduced by obviating a need to wait for an RRC reconfiguration message (to convey a new MCG configuration) after a successful re-establishment. In other words, based at least in part on maintaining the set of MCG configurations after successful re-establishment, the UE 120 may use a conditional configuration, of the set of MCG configurations, for a selected cell to which a connection is re-established, rather than waiting for a new MCG configuration to be signaled for the selected cell. In contrast, if, after cell selection, the selected cell is not a cell for which a conditional configuration was provided with the set of MCG configurations, the UE 120 may discard the set of MCG configurations and a source cell configuration and may subsequently receive a new MCG configuration for the source cell.

In some aspects, the UE 120 may receive a handover command in connection with a CHO evaluation. For example, the UE 120 may receive the handover command during performance of the a CHO evaluation. In this case, if a target cell in the handover command is a cell for which a conditional configuration was provided in the set of MCG configurations, the UE 120 may maintain the set of MCG configurations and a source cell configuration after successful re-establishment (e.g., a first communication procedure) and may apply a conditional configuration of the selected cell to the selected cell (e.g., in a second communication procedure). In some aspects, the UE 120 may maintain the set of MCG configurations after re-establishment based at least in part on receiving an indication from the network node 110 to maintain the set of MCG configurations. In contrast, if, after cell selection, the selected cell is not a cell for which a conditional configuration was provided in the plurality of MCG configurations, the UE 120 may discard the set of conditional configurations and a source cell configuration.

In some aspects, the UE may detect a failure during an evaluation of a set of target PSCells. For example, the UE 120 may detect an MCG RLF during an evaluation of a set of target PSCells. In this case, based at least in part on detecting the MCG RLF during the evaluation of the set of target PSCells (e.g., the first communication procedure), the UE 120 may stop the evaluation, may maintain the set of conditional configurations (e.g., a set of SCG configurations), and may initiate an MCG failure information procedure (e.g., the second communication procedure). Additionally, or alternatively, the UE 120 may detect an SCG failure during an evaluation of a set of target PSCells (e.g., the first communication procedure), may stop the evaluation, may maintain the set of conditional configurations (e.g., a set of SCG configurations), and may initiate an SCG failure information procedure (e.g., the second communication procedure). In these cases, based at least in part on the UE 120 maintaining the conditional configurations, the network node 110 may provide delta values or offset values for the set of SCG configurations when reconfiguring the UE 120, rather than a new set of SCG configurations, thereby reducing network overhead.

In some aspects, the UE 120 may detect a failure during a conditional execution. For example, the UE 120 may detect an RLF on an MCG while performing a RACH procedure on a selected target PSCell. In this case, the UE 120 may perform an RRC re-establishment procedure and may forgo initiating an MCG failure information procedure (e.g., based at least in part on the RACH procedure being ongoing and signaling bearers on a target secondary node not being established). Alternatively, the UE 120 may wait until the RACH procedure is completed and may perform an MCG failure information procedure (e.g., based at least in part on a target node being established with signaling bearers). In these cases, the UE 120 may maintain a set of conditional configurations (e.g., a set of SCG configurations), as the set of conditional configurations remain applicable after the failure is detected. Alternatively, if, during the RRC re-establishment procedure, a timer expires (e.g., the UE 120 does not receive an RRC re-establishment message before expiration of timer T301), the UE 120 may release the set of SCG configurations and transition from a first mode (e.g., an RRC active mode) to a second mode (e.g., an RRC idle mode).

As indicated above, FIG. 5 is provided as an example. Other examples may differ from what is described with respect to FIG. 5.

Figure 6:
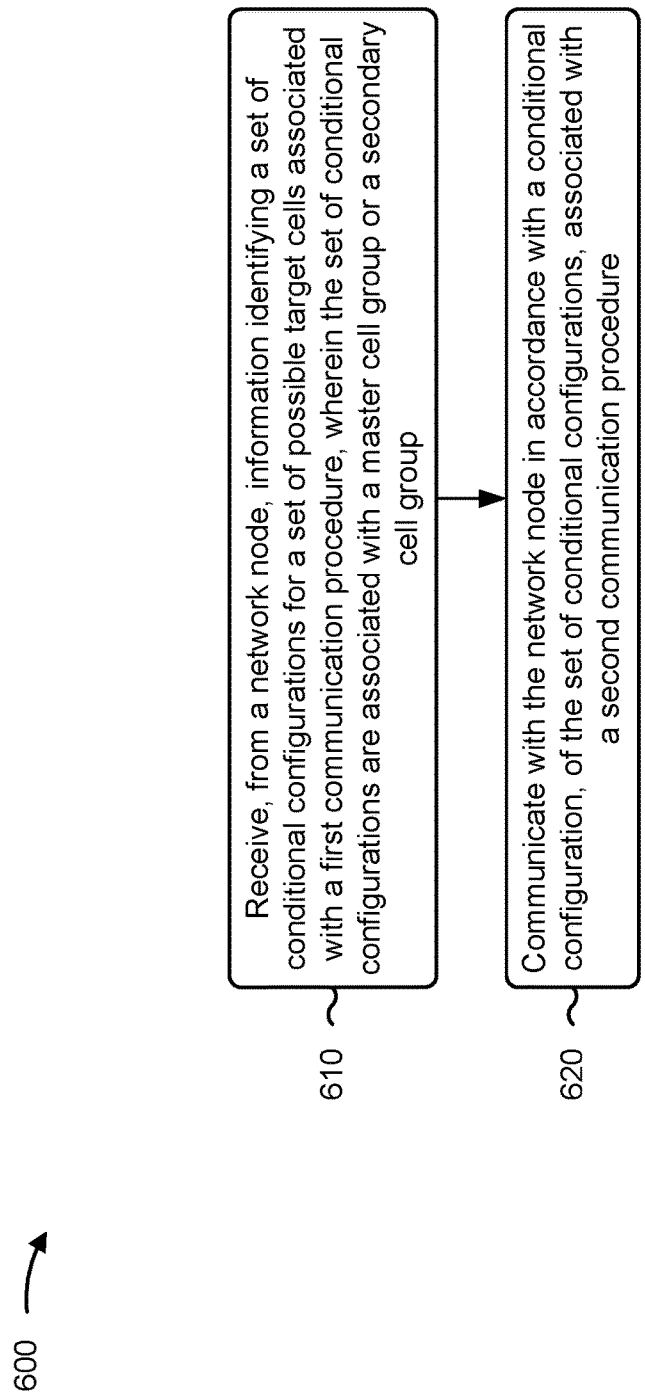
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with failure handling for multiple configuration communication scenarios.

As shown in FIG. 6, in some aspects, process 600 may include receiving, from a network node, information identifying a set of conditional configurations for a set of possible target cells associated with a first communication procedure, wherein the set of conditional configurations are associated with a master cell group or a secondary cell group (block 610). For example, the UE (e.g., using communication manager 140 and/or reception component 702, depicted in FIG. 7) may receive, from a network node, information identifying a set of conditional configurations for a set of possible target cells associated with a first communication procedure, wherein the set of conditional configurations are associated with a master cell group or a secondary cell group, as described above.

As further shown in FIG. 6, in some aspects, process 600 may include communicating with the network node or another network node in accordance with a conditional configuration, of the set of conditional configurations, associated with a second communication procedure (block 620). For example, the UE (e.g., using communication manager 140 and/or reception component 702 or transmission component 704, depicted in FIG. 7) may communicate with the network node or another network node in accordance with a conditional configuration, of the set of conditional configurations, associated with a second communication procedure, as described above.

Process 600 may include additional aspects, such as any single aspect or any combination of aspects described below and/or in connection with one or more other processes described elsewhere herein.

In a first aspect, process 600 includes detecting a failure associated with a random access channel procedure on a target cell for which a conditional handover is triggered, and storing the set of conditional configurations after the first communication procedure, wherein the first communication procedure is a recovery procedure for the failure associated with the random access channel procedure. By storing the set of conditional configurations, rather than discarding the set of conditional configurations, the conditional configurations are made available for use in a second communication procedure, thereby reducing a latency for the recovery procedure.

In a second aspect, alone or in combination with the first aspect, process 600 includes receiving information indicating that the set of conditional configurations are to be maintained after the first communication procedure, and storing the set of conditional configurations after the first communication procedure comprises storing the set of conditional configurations based at least in part on receiving the information indicating that the set of conditional configurations are to be maintained after the first communication procedure. By storing the set of conditional configurations based at least in part on receiving a message, rather than discarding the set of conditional configurations, the UE is caused, by a network node, to make the conditional configurations available for use in a second communication procedure, thereby reducing a latency.

In a third aspect, alone or in combination with one or more of the first and second aspects, the first communication procedure is a recovery procedure not associated with a handover failure, and process 600 includes selecting, in connection with the recovery procedure, a cell associated with a conditional configuration of the set of conditional configurations, and storing the set of conditional configurations after the first communication procedure based at least in part on selecting the cell associated with the conditional configuration of the set of conditional configurations. By storing the set of conditional configurations based at least in part on selecting a cell associated with the set of conditional configurations, the UE ensures that conditional configurations that remain valid are maintained and can, in another case, discard conditional configurations that are no longer valid, thereby saving memory.

In a fourth aspect, alone or in combination with one or more of the first through third aspects, process 600 includes receiving a handover command in connection with a conditional handover evaluation, wherein a target cell of the handover command is associated with a conditional configuration of the set of conditional configurations, and storing the set of conditional configurations after the first communication procedure based at least in part on the target cell being associated with the conditional configuration of the set of conditional configurations. By storing the set of conditional configurations based at least in part on selecting a target cell associated with the set of conditional configurations, the UE ensures that conditional configurations that remain valid are maintained and can, in another case, discard conditional configurations that are no longer valid, thereby saving memory.

In a fifth aspect, alone or in combination with one or more of the first through fourth aspects, process 600 includes selecting a cell for a radio resource control re-establishment procedure, wherein the selected cell is associated with a conditional configuration of the set of conditional configurations, and storing the set of conditional configurations after the first communication procedure based at least in part on the selected cell being associated with the conditional configuration of the set of conditional configurations. By storing the set of conditional configurations based at least in part on selecting a cell associated with the set of conditional configurations, the UE ensures that conditional configurations that remain valid are maintained and can, in another case, discard conditional configurations that are no longer valid, thereby saving memory.

In a sixth aspect, alone or in combination with one or more of the first through fifth aspects, process 600 includes performing a recovery procedure for a radio link failure on a master cell group in connection with a random access channel procedure, on a selected target primary secondary cell, associated with a conditional execution, and storing one or more of the set of conditional configurations after the first communication procedure based at least in part on performing the recovery procedure, wherein the one or more of the set of conditional configurations are associated with a secondary cell group. In this case, recovery can occur faster based at least in part on an availability of the set of conditional configurations.

In a seventh aspect, alone or in combination with one or more of the first through sixth aspects, the recovery procedure is a radio resource control re-establishment procedure or a master cell group failure information procedure.

In an eighth aspect, alone or in combination with one or more of the first through seventh aspects, process 600 includes detecting expiration of a timer associated with the recovery procedure, and releasing the one or more of the set of conditional configurations based at least in part on detecting the expiration of the timer. In this way, the UE can reuse memory after a period of time rather than maintaining stale conditional configurations (e.g., configurations that may no longer be useful for connections).

In a ninth aspect, alone or in combination with one or more of the first through eighth aspects, process 600 includes transitioning from a first power state to a second power state based at least in part on detecting the expiration of the timer. This may reduce power utilization for the UE.

In a tenth aspect, alone or in combination with one or more of the first through ninth aspects, process 600 includes applying a conditional configuration, of the set of conditional configurations, to a second communication procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
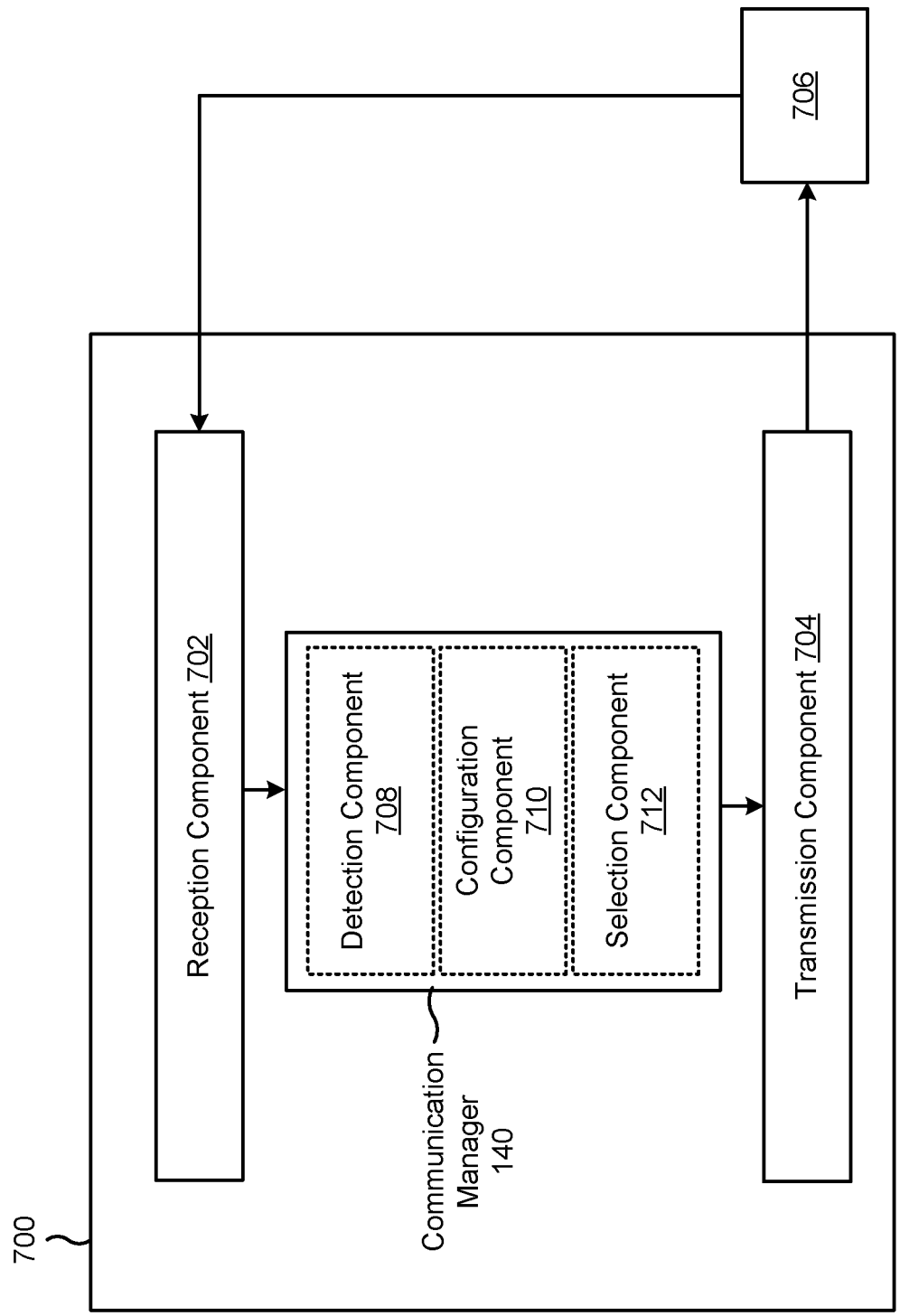
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a detection component 708, a configuration component 710, and/or a selection component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, from a network node, information identifying a set of conditional configurations for a set of possible target cells associated with a first communication procedure, wherein the set of conditional configurations are associated with a master cell group or a secondary cell group. The reception component 702 and/or the transmission component 704 may communicate with the network node or another network node in accordance with a conditional configuration, of the set of conditional configurations, associated with a second communication procedure.

The detection component 708 may detect a failure associated with a random access channel procedure on a target cell for which a conditional handover is triggered. The configuration component 710 may store the set of conditional configurations after the first communication procedure, wherein the first communication procedure is a recovery procedure for the failure associated with the random access channel procedure. The reception component 702 may receive information indicating that the set of conditional configurations are to be maintained after the first communication procedure.

The reception component 702 may receive a handover command in connection with a conditional handover evaluation, wherein a target cell of the handover command is associated with a conditional configuration of the set of conditional configurations. The configuration component 710 may store the set of conditional configurations after the first communication procedure based at least in part on the target cell being associated with the conditional configuration of the set of conditional configurations. The selection component 712 may select a cell for a radio resource control re-establishment procedure, wherein the selected cell is associated with a conditional configuration of the set of conditional configurations.

The configuration component 710 may store the set of conditional configurations after the first communication procedure based at least in part on the selected cell being associated with the conditional configuration of the set of conditional configurations. The reception component 702 and/or the transmission component 704 may receive or transmit one or more signals to perform a recovery procedure for a radio link failure on a master cell group in connection with a random access channel procedure, on a selected target primary secondary cell, associated with a conditional execution. The configuration component 710 may store one or more of the set of conditional configurations after the first communication procedure based at least in part on performing the recovery procedure, wherein the one or more of the set of conditional configurations are associated with a secondary cell group.

The detection component 708 may detect expiration of a timer associated with the recovery procedure. The configuration component 710 may release the one or more of the set of conditional configurations based at least in part on detecting the expiration of the timer. The configuration component 710 may transition from a first power state to a second power state based at least in part on detecting the expiration of the timer.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a network node, information identifying a set of conditional configurations for a set of possible target cells associated with a first communication procedure, wherein the set of conditional configurations are associated with a master cell group or a secondary cell group; and communicating with the network node or another network node in accordance with a conditional configuration, of the set of conditional configurations, associated with a second communication procedure.

Aspect 2: The method of Aspect 1, further comprising: detecting a failure associated with a random access channel procedure on a target cell for which a conditional handover is triggered; and storing the set of conditional configurations after the first communication procedure, wherein the first communication procedure is a recovery procedure for the failure associated with the random access channel procedure.

Aspect 3: The method of Aspect 2, further comprising: receiving information indicating that the set of conditional configurations are to be maintained after the first communication procedure; and wherein storing the set of conditional configurations after the first communication procedure comprises: storing the set of conditional configurations based at least in part on receiving the information indicating that the set of conditional configurations are to be maintained after the first communication procedure.

Aspect 4: The method of any of Aspects 1 to 3, wherein the first communication procedure is a recovery procedure not associated with a handover failure, and further comprising: selecting, in connection with the recovery procedure, a cell associated with a conditional configuration of the set of conditional configurations; and storing the set of conditional configurations after the first communication procedure based at least in part on selecting the cell associated with the conditional configuration of the set of conditional configurations.

Aspect 5: The method of any of Aspects 1 to 4, further comprising: receiving a handover command in connection with a conditional handover evaluation, wherein a target cell of the handover command is associated with a conditional configuration of the set of conditional configurations; and storing the set of conditional configurations after the first communication procedure based at least in part on the target cell being associated with the conditional configuration of the set of conditional configurations.

Aspect 6: The method of any of Aspects 1 to 5, further comprising: selecting a cell for a radio resource control re-establishment procedure, wherein the selected cell is associated with a conditional configuration of the set of conditional configurations; and storing the set of conditional configurations after the first communication procedure based at least in part on the selected cell being associated with the conditional configuration of the set of conditional configurations.

Aspect 7: The method of any of Aspects 1 to 6, further comprising: performing a recovery procedure for a radio link failure on a master cell group in connection with a random access channel procedure, on a selected target primary secondary cell, associated with a conditional execution; and storing one or more of the set of conditional configurations after the first communication procedure based at least in part on performing the recovery procedure, wherein the one or more of the set of conditional configurations are associated with a secondary cell group.

Aspect 8: The method of Aspect 7, wherein the recovery procedure is a radio resource control re-establishment procedure or a master cell group failure information procedure.

Aspect 9: The method of any of Aspects 7 to 8, further comprising: detecting expiration of a timer associated with the recovery procedure; and releasing the one or more of the set of conditional configurations based at least in part on detecting the expiration of the timer.

Aspect 10: The method of Aspect 9, further comprising: transitioning from a first power state to a second power state based at least in part on detecting the expiration of the timer.

Aspect 11: The method of any of Aspects 1 to 10, further comprising: applying a conditional configuration, of the set of conditional configurations, to a second communication procedure.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive, from a network node, information identifying a set of conditional configurations for a set of possible target cells associated with a first communication procedure, wherein the set of conditional configurations are associated with a master cell group or a secondary cell group;
      communicate with the network node or another network node in accordance with a conditional configuration, of the set of conditional configurations, associated with a second communication procedure;
      detect a failure associated with a random access channel procedure on a target cell; and
      perform, after detecting the failure, a first recovery procedure when the random access channel procedure is ongoing or a second recovery procedure when the random access channel procedure is complete.

2. The UE of claim 1, wherein the target cell is for which a conditional handover is triggered, and wherein the one or more processors are further configured to:
   store the set of conditional configurations after the first communication procedure, wherein the first communication procedure is a third recovery procedure for the failure associated with the random access channel procedure.

3. The UE of claim 2, wherein the one or more processors are further configured to:
   receive information indicating that the set of conditional configurations are to be maintained after the first communication procedure; and
   wherein the one or more processors, to store the set of conditional configurations after the first communication procedure, are configured to:
      store the set of conditional configurations based at least in part on receiving the information indicating that the set of conditional configurations are to be maintained after the first communication procedure.

4. The UE of claim 1, wherein the first communication procedure is a third recovery procedure not associated with a handover failure, and
   wherein the one or more processors are further configured to:
      select, in connection with the third recovery procedure, the target cell, wherein the target cell is associated with a conditional configuration of the set of conditional configurations; and
      store the set of conditional configurations after the first communication procedure based at least in part on selecting the target cell.

5. The UE of claim 1, wherein the one or more processors are further configured to:
   receive a handover command in connection with a conditional handover evaluation, wherein the target cell is associated with a conditional configuration of the set of conditional configurations; and
   store the set of conditional configurations after the first communication procedure based at least in part on the target cell being associated with the conditional configuration of the set of conditional configurations.

6. The UE of claim 1, wherein the one or more processors are further configured to:
   select the target cell for the first recovery procedure wherein the target cell is associated with a conditional configuration of the set of conditional configurations; and
   store the set of conditional configurations after the first communication procedure based at least in part on selecting the target cell.

7. The UE of claim 1, wherein the one or more processors, to detect the failure, are configured to:
   detect a radio link failure on a master cell group while performing the random access channel procedure, on a selected target primary secondary cell, associated with a conditional execution.

8. The UE of claim 1, wherein at least one of:
   the first recovery procedure is a radio resource control re-establishment procedure, or
   the second recovery procedure is a master cell group failure information procedure.

9. The UE of claim 1, wherein the one or more processors are further configured to:
   detect an expiration of a timer associated with the first recovery procedure; and
   release one or more of the set of conditional configurations based at least in part on detecting the expiration of the timer.

10. The UE of claim 9, wherein the one or more processors are further configured to:
    transition from a first power state to a second power state based at least in part on detecting the expiration of the timer.

11. The UE of claim 1, wherein the one or more processors are further configured to:
apply a conditional configuration, of the set of conditional configurations, to the second communication procedure.

12. A method of wireless communication performed by a user equipment (UE), comprising:
receiving, from a network node, information identifying a set of conditional configurations for a set of possible target cells associated with a first communication procedure, wherein the set of conditional configurations are associated with a master cell group or a secondary cell group;
communicating with the network node or another network node in accordance with a conditional configuration of the set of conditional configurations, associated with a second communication procedure;
detecting a failure associated with a random access channel procedure on a target cell; and
performing, after detecting the failure, a first recovery procedure when the random access channel procedure is ongoing or a second recovery procedure when the random access channel procedure is complete.

13. The method of claim 12, wherein the target cell is for which a conditional handover is triggered, and
further comprising:
storing the set of conditional configurations after the first communication procedure, wherein the first communication procedure is a third recovery procedure for the failure associated with the random access channel procedure.

14. The method of claim 13, further comprising:
receiving information indicating that the set of conditional configurations are to be maintained after the first communication procedure; and
wherein storing the set of conditional configurations after the first communication procedure comprises:
storing the set of conditional configurations based at least in part on receiving the information indicating that the set of conditional configurations are to be maintained after the first communication procedure.

15. The method of claim 12, wherein the first communication procedure is a third recovery procedure not associated with a handover failure, and
further comprising:
selecting, in connection with the third recovery procedure, the target cell, wherein the target cell is associated with a conditional configuration of the set of conditional configurations; and
storing the set of conditional configurations after the first communication procedure based at least in part on selecting the target cell.

16. The method of claim 12, further comprising:
receiving a handover command in connection with a conditional handover evaluation, wherein the target cell is associated with a conditional configuration of the set of conditional configurations; and
storing the set of conditional configurations after the first communication procedure based at least in part on the target cell being associated with the conditional configuration of the set of conditional configurations.

17. The method of claim 12, further comprising:
selecting the target cell for the first recovery procedure, wherein the target cell is associated with a conditional configuration of the set of conditional configurations; and
storing the set of conditional configurations after the first communication procedure based at least in part on selecting the target cell.

18. The method of claim 12, wherein detecting the failure comprises:
detecting a radio link failure on a master cell group while performing the random access channel procedure, on a selected target primary secondary cell, associated with a conditional execution.

19. The method of claim 12, wherein at least one of:
the first recovery procedure is a radio resource control re-establishment procedure, or
the second recovery procedure is a master cell group failure information procedure.

20. The method of claim 12, further comprising:
detecting an expiration of a timer associated with the first recovery procedure; and
releasing the one or more of the set of conditional configurations based at least in part on detecting the expiration of the timer.

21. The method of claim 20, further comprising:
transitioning from a first power state to a second power state based at least in part on detecting the expiration of the timer.

22. The method of claim 12, further comprising:
applying a conditional configuration, of the set of conditional configurations, to the second communication procedure.

23. A non-transitory computer-readable medium storing a set of instructions for wireless communication, the set of instructions comprising:
one or more instructions that, when executed by one or more processors of a user equipment (UE), cause the UE to:
receive, from a network node, information identifying a set of conditional configurations for a set of possible target cells associated with a first communication procedure, wherein the set of conditional configurations are associated with a master cell group or a secondary cell group;
communicate with the network node or another network node in accordance with a conditional configuration, of the set of conditional configurations, associated with a second communication procedure;
detect a failure associated with a random access channel procedure on a target cell; and
perform, after detecting the failure, a first recovery procedure when the random access channel procedure is ongoing or a second recovery procedure when the random access channel procedure is complete.

24. The non-transitory computer-readable medium of claim 23, wherein the target cell is for which a conditional handover is triggered, and wherein the one or more instructions further cause the UE to: store the set of conditional configurations after the first communication procedure, wherein the first communication procedure is a third recovery procedure for the failure associated with the random access channel procedure.

25. The non-transitory computer-readable medium of claim 24, wherein the one or more instructions further cause the UE to:
receive information indicating that the set of conditional configurations are to be maintained after the first communication procedure; and wherein the one or more instructions, that cause the UE to store the set of conditional configurations after the first communication procedure, cause the UE to:
  store the set of conditional configurations based at least in part on receiving the information indicating that the set of conditional configurations are to be maintained after the first communication procedure.

26. The non-transitory computer-readable medium of claim 23, wherein the first communication procedure is a third recovery procedure not associated with a handover failure, and
wherein the one or more instructions further cause the UE to:
  select, in connection with the third recovery procedure, the target cell, wherein the target cell is associated with a conditional configuration of the set of conditional configurations; and
  store the set of conditional configurations after the first communication procedure based at least in part on selecting the target cell.

27. The non-transitory computer-readable medium of claim 23, wherein the one or more instructions further cause the UE to:
  receive a handover command in connection with a conditional handover evaluation, wherein the target cell is associated with a conditional configuration of the set of conditional configurations; and
  store the set of conditional configurations after the first communication procedure based at least in part on the target cell being associated with the conditional configuration of the set of conditional configurations.

28. The non-transitory computer-readable medium of claim 23, wherein the one or more instructions further cause the UE to:
  select the target cell for the first recovery procedure, wherein the target cell is associated with a conditional configuration of the set of conditional configurations; and
  store the set of conditional configurations after the first communication procedure based at least in part on selecting the target cell.

29. An apparatus for wireless communication, comprising:
  means for receiving, from a network node, information identifying a set of conditional configurations for a set of possible target cells associated with a first communication procedure, wherein the set of conditional configurations are associated with a master cell group or a secondary cell group;
  means for communicating with the network node or another network node in accordance with a conditional configuration, of the set of conditional configurations, associated with a second communication procedure;
  means for detecting a failure associated with a random access channel procedure on a target cell; and
  means for performing, after detecting the failure, a first recovery procedure when the random access channel procedure is ongoing or a second recovery procedure when the random access channel procedure is complete.

30. The apparatus of claim 29, wherein the target cell is for which a conditional handover is triggered, and the apparatus further comprising:
  means for storing the set of conditional configurations after the first communication procedure, wherein the first communication procedure is a third recovery procedure for the failure associated with the random access channel procedure.

* * * * *